G. A. GRIFFIN.
ATTACHMENT FOR TRIAL FRAMES.
APPLICATION FILED AUG. 1, 1908.
1,002,580.
Patented Sept. 5, 1911.
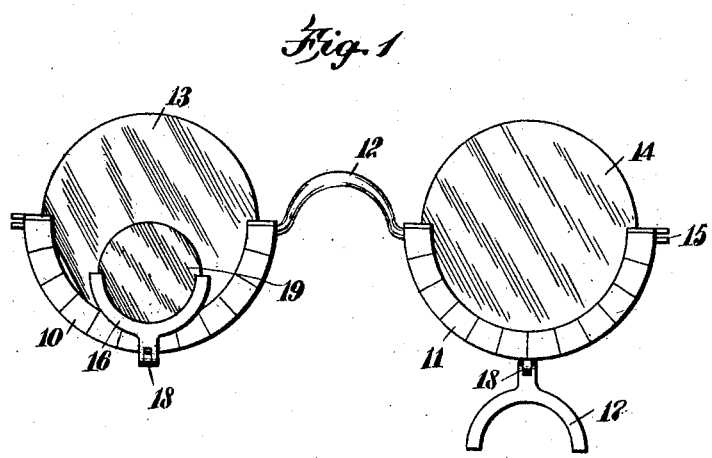
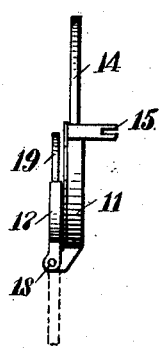
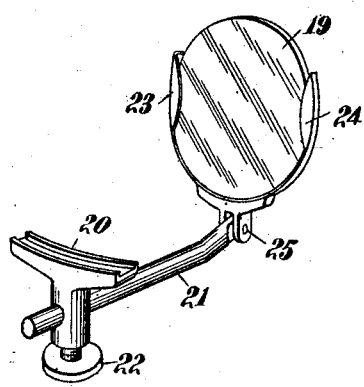
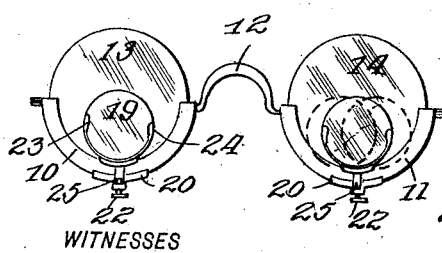
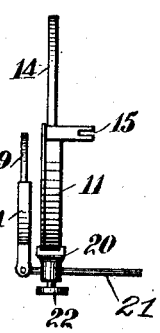
WITNESSES
INVENTOR
George A. Griffin
BY
ATTORNEYS

UNITED STATES PATENT OFFICE.

GEORGE A. GRIFFIN, OF NEW YORK, N. Y.

ATTACHMENT FOR TRIAL-FRAMES.

1,002,580.

Specification of Letters Patent.

Patented Sept. 5, 1911.

Application filed August 1, 1908. Serial No. 446,418.

*To all whom it may concern:*

Be it known that I, GEORGE A. GRIFFIN, a citizen of the United States, and a resident of the city of New York, borough of Brooklyn, in the county of Kings and State of New York, have invented a new and Improved Attachment for Trial-Frames, of which the following is a full, clear, and exact description.

This invention relates to certain improvements in trial frames for use by opticians in testing the eyes and selecting lenses of the proper characteristics for use in spectacles and eyeglasses.

The object of the invention is to provide an attachment for supporting a smaller lens substantially parallel to the trial lenses and adjacent the lower portion thereof, so that the eyes may be tested both for long distance and for reading at the same time, and the patient may know the advantages and operation of using a bifocal lens rather than having separate pairs of eyeglasses or spectacles for general use and for reading.

Reference is to be had to the accompanying drawings, forming a part of this specification, in which similar characters of reference indicate corresponding parts in all the figures, and in which—

Figure 1 is a front view of a simple form of trial frame having a pair of my improved attachments secured thereto; Fig. 2 is an end view of the construction shown in Fig. 1; Fig. 3 is a perspective view of a preferred form of attachment; Fig. 4 is a view similar to Fig. 2, but showing the attachment illustrated in Fig. 3; and Fig. 5 is a front view of a simple form of trial frame having the attachment shown in Figs. 3 and 4.

My improved device is adaptable for use in connection with any form of trial frame, as the details of the latter constitute no portion of my invention.

In Figs. 1 and 2, I have illustrated a very simple form of trial frame in which there are provided two grooved semi-circular lens supports 10 and 11, connected by a bridge piece 12. The lens supports are adapted to receive trial lenses 13 and 14, said lenses being readily detachable to permit of the substitution of other lenses during the use of the frame. Each lens support, as illustrated, is provided with a curved groove, which receives the lower edge of the lens and holds it against lateral movement. The frame may be supported in any suitable manner, as, for instance, by bows 15, and each lens support may be provided with a plurality of grooves, so as to receive a plurality of trial lenses of the same diameter simultaneously.

In connection with the trial frame above described, I provide means for supporting smaller lenses substantially parallel to the main trial lenses, so that while the main lenses are correct for distance work, the lower portion may be modified by the action of the small secondary trial lenses to make them proper for reading or close work. In the specific form illustrated in Figs. 1 and 2, this means comprises an attachment to each of the main lens supports and in the form of secondary lens supports 16 and 17. Each of these secondary lens supports is semi-circular in form and is provided at its lower edge with a hinge 18, connecting it to the main lens support. The secondary supports 16 and 17 are grooved in their upper surfaces to receive secondary trial lenses 19, which latter are of a diameter very materially less than the diameter of the main trial lenses. As shown, the secondary lenses are of substantially one-half the diameter of the main lenses, and the secondary lens supports are so mounted that the upper edges of the secondary lenses come adjacent the center of the main lenses. By hinging the secondary lens supports as illustrated, they may be moved out of the range of vision, as indicated at the right-hand side of Fig. 1, so that the proper trial lens may be selected for distance work. After the proper main lens has been selected, the secondary lens support may be swung to the position indicated in Fig. 1 and the proper secondary lens selected, which in conjunction with the main lens will enable the patient to observe clearly, printed or other mattter close at hand. With the proper lens in position in the trial frame, the patient may glance from objects at a distance to objects close at hand, so that the clearness of both may be ascertained substantially simultaneously and the effect of a bi-focal lens noted. In making up the lenses for eyeglasses or spectacles, the strength and characteristics of the main trial lenses and also of the secondary trial lenses being known, a bi-focal lens may be constructed which will have the same properties as the combined main lens and its secondary lens.

The form illustrated in Figs. 1 and 2 is suitable for use on trial frames in which the distance between the centers of the lenses need not be adjusted for persons having different distances between their pupilary centers. To adapt the invention to any and all forms of trial frames and in order to secure an adjustment of the auxiliary lens supports in accordance with varying pupilary center distances, I provide the form illustrated in Fig. 3. In this form, there is provided a lug or bracket 20, adapted to be soldered to the lower portion of the main lens support of a trial frame, and through this lug extends a short rod 21 which may be adjusted longitudinally and which may be locked rigidly in position by means of a suitable set screw 22. At the outer end of the rod is a lens holder in the form of two spring arms 23 and 24, adapted to grip the lens at substantially diametrically opposite points. The arms are connected to the rod by a hinge member 25, so that without varying the adjustment of the rod in respect to the bracket 20, the secondary lens may be moved into or out of the line of vision through the main lens. The secondary lens is thus capable of three separate and independent movements. First, it may be moved about the hinge; second, the rod may be rotated, and, third, the rod may be moved longitudinally. The object of the first movement is to permit the secondary lens to be moved into or out of line of vision without affecting the adjustment of the rod. Main lenses of different thicknesses may be employed in the main frame, and it is desirable that the secondary lens be as close to the main lens as possible and parallel thereto. By moving the rod 21 longitudinally the secondary lens may be brought in closely adjacent to and in a plane parallel with the main lens independent of the thickness of the latter. When a person looks at an object at a distance, the lines of vision from the two pupils are substantially parallel and the centers of the main lenses are spaced apart a distance equal to the distance between the pupilary centers. When a person looks at an object close at hand, the lines of vision converge upon that object, and as the glasses are nearer to the object than are the eyes, the distance between the centers of the auxiliary lenses should be closer together than the distance between the pupils. The distance between the pupils varies from approximately two inches to approximately two and three-quarter inches, and the angles of convergence upon objects at a uniform distance, varies in accordance with the distances between the centers. By rotating the rod 21 through a very slight angle, the two auxiliary lenses may be brought toward or from each other in the same plane without materially raising or lowering either lens. The centers of the auxiliary lenses may be brought closer together than are the centers of the main lenses, and the difference between the distances may be varied in accordance with the distances between the pupilary centers of the patient.

Having thus described my invention, I claim as new and desire to secure by Letters Patent:

1. A trial frame having means for detachably supporting a pair of main trial lenses, means for engaging with the lower portion only of a pair of secondary and smaller trial lenses to detachably support them adjacent the lower portion of the main lenses, and connections between said supporting means to permit the secondary lenses to be moved toward or from each other in their own plane to vary the distances between the centers of the secondary lenses independently of the variation in the distances between the centers of the main lenses.

2. A trial frame having means for detachably supporting a pair of main trial lenses, means for engaging with the lower portion only of a pair of secondary and smaller trial lenses to detachably support them adjacent the lower portion of the main lenses, and connections between said supporting means to permit the secondary lenses to be moved toward or from each other in their own plane to vary the distances between the centers of the secondary lenses independently of the variation in the distances between the centers of the main lenses, and also to permit the secondary lenses to be moved bodily toward or from the main trial lenses in accordance with variations in the thickness of said main trial lenses.

3. A trial frame, including means for detachably supporting a pair of main trial lenses, means for detachably supporting a pair of secondary trial lenses adjacent the lower portions of the main trial lenses, and connections between said supports to permit said secondary trial lenses to move toward and from each other in their own plane and to permit either to be moved out of the line of vision through its corresponding main trial lens independently of said lateral movement.

4. A trial frame, including a grooved semi-circular support for detachably supporting a main trial lens, and means carried by said support at the lower edge thereof for engagement with the lower portion only of a second and smaller trial lens for detachably supporting the same adjacent the lower portion of the main trial lens, said second lens-supporting means being removable from the first-mentioned support.

5. A trial frame, including a grooved semi-circular support for detachably supporting a main trial lens, and means carried by said support at the lower edge thereof for engagement with the lower portion only of a second and smaller trial lens for detachably supporting the same adjacent the lower portion of the main trial lens, said second lens-supporting means being movable out of the line of vision through the main lens.

6. An attachment for trial frames, comprising a bracket adapted to be secured to the trial frame, a rod longitudinally movable in respect to said bracket, means for locking said rod rigid in respect to said bracket, oppositely-disposed spring arms for engagement with a lens, and a hinge member connecting said arms to one end of said rod.

7. An attachment for trial frames, comprising a bracket adapted to be secured to the trial frame, a rotatable rod longitudinally movable in respect to said bracket, means for locking said rod rigid in respect to said bracket, oppositely-disposed spring arms for engagement with a lens, and means connecting said arms to one end of said rod.

8. An attachment for trial frames, comprising a bracket adapted to be secured to the trial frame, a rotatable rod longitudinally movable through said bracket, means for locking said rod rigidly in position in respect to said bracket, oppositely-disposed spring arms for engagement with a lens, and a hinge member connecting said arms to one end of said rod.

9. The combination with a bifocal trial set having distant lenses, of a pair of ancillary lens holders mounted to oscillate in the direction of the line of vision through said lenses, and adjustable in a plane at right angles to said line of vision.

10. In a device of the character described, the combination of a lens holder, and a support for said holder, said lens holder being mounted to oscillate in the direction of the line of vision through the lens, and adjustable in a plane at right angles to said line of vision.

11. The combination with a bifocal trial set having distant lenses, of a pair of trial wafer lens holders, supports for said holders, and means for adjusting said holders in a plane at right angles to the line of vision through said lenses.

12. In combination with an eye testing or trial frame, a lens mounting with a projection thereon, and a member attached to said frame for receiving and holding the projection on said mounting.

13. The combination with a testing frame for holding testing lenses, of a pair of frames for holding bifocal segment testing lenses carried by the testing frame.

14. The combination with a support for a main testing lens, of a bifocal segment testing lens holder, and a connection between said support and said holder for maintaining said holder at various positions of adjustment in a plane parallel with the plane of the support.

15. A trial frame having means for detachably supporting a main trial lens, and means carried by said first-mentioned means adjacent the lower edge of the latter for engagement with the lower portion only of a second and smaller trial lens for detachably supporting the same adjacent the lower portion of the main trial lens, said second-mentioned lens-supporting means being removable from said first-mentioned means.

16. A trial frame including a support for a main trial lens, and a holder for a second and smaller trial lens, for supporting the latter adjacent the lower portion of the main trial lens, said holder being removable from said support.

17. An attachment for trial frames including a support for detachably receiving a small trial lens, and means for securing said support to a trial frame, to hold said trial lens adjacent the lower portion of the main trial lens in the trial frame.

In testimony whereof I have signed my name to this specification in the presence of two subscribing witnesses.

GEORGE A. GRIFFIN.

Witnesses:
CLAIR W. FAIRBANK,
EVERARD B. MARSHALL.